Jan. 20, 1931.  C. F. BAILEY  1,789,290
WIRE FASTENER
Filed March 22, 1929
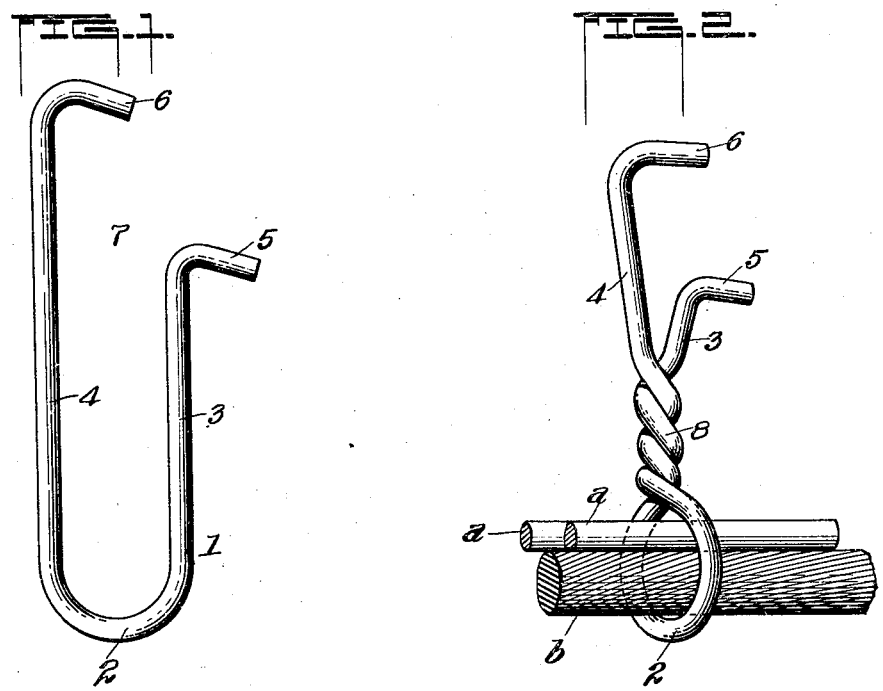
INVENTOR.
Charles F. Bailey
Att'y Patented Jan. 20, 1931

1,789,290

UNITED STATES PATENT OFFICE

CHARLES F. BAILEY, OF PEORIA, ILLINOIS, ASSIGNOR TO WILLIAM H. SOMMER, OF PEORIA, ILLINOIS

WIRE FASTENER

Application filed March 22, 1929. Serial No. 349,191.

This invention has reference to a fastening device, preferably one made from a single piece of wire and bent to a form suitable for the purposes for which it is intended to be used.

What I have in mind is a wire fastener for securing together several elements, as for instance, pairs of wires accompanying and forming part of an articulated concrete mattress used in revetment work to protect river banks from scour or erosion, and to secure such wires to an anchoring cable which sustains the mattress in position on the river bank.

The use of the fastener is shown and described in a companion application filed of even date herewith and bearing Serial No. 341,189.

The invention comprehends a wire fastener made from a single piece of wire bent to provide spaced legs, one preferably shorter than the other with the free ends of the legs turned at right angles and preferably in the same direction. That is to say, the angular end of the shorter leg is bent outwardly while the angular end of the longer leg is bent inwardly, and the position of both angular ends or portions of the fastener provide a throat for the entrance or insertion of the parts or elements to be secured down in between the legs of the fastener, so that with the application of a suitable tool to the angular end portions of the fastener, the legs may be twisted together to secure parts or elements therebetween. The angular ends of the fastener, preventing, when operated on by a twisting tool, slippage and insuring the twisting of one leg of the fastener with the other leg.

A tool such as intended for the uses herein described being shown in a companion application, filed of even date herewith and bearing Serial No. 349,190.

That the invention may be more fully understood, reference is had to the accompanying drawings forming part of this description, illustrating a preferred embodiment of the invention, in which:—

Fig. 1 is a view in elevation showing a wire fastener embodying my invention, and Fig. 2 is a view in elevation, partially in perspective, showing the fastener with the legs twisted together, securing therebetween wires, such as form part of an articulated concrete mattress and also securing such wires to an anchoring member, as for instance, a cable.

Like characters of reference denote corresponding parts thruout the figures.

The fastener disclosed, preferably comprises a length of wire 1 bent back on itself to provide the arcuate end 2 with spaced legs 3 and 4 leading or extending therefrom; the leg 3 being shorter than the leg 4 and the terminal or free ends of both legs bent at right angles, as at 5 and 6, respectively. It is preferable to turn the angular end 5 of the leg 3 outwardly and away from the leg 4 and to turn the angular end 6 of the leg 4 inwardly and toward the leg 3, as shown.

The disposition of the angular ends 5 and 6 of the legs 3 and 4 is such as to provide a throat 7 therebetween, for the insertion of parts or elements, to be secured, down into and between the legs of the fastener, as will, no doubt, be understood.

In Fig. 2, the fastener is shown as having been secured to wires $a$, $a$ forming part of a preferably articulated concrete mattress, not shown, and secured to an anchoring member, as for instance, a cable $b$.

In the application of the fastener to parts to be secured, such for instance, to the wires $a$, $a$ and an anchoring cable $b$ of an articulated concrete mattress, the fastener is slipped into position by the insertion of the longer leg 4 under the wires $a$, $a$ and cable $b$ and causing such wires and cable to enter the throat 7 of the fastener and thence between the legs 3 and 4 and to the arcuate end 2, when on the application of a suitable tool, not shown, to the angular ends 5 and 6 of the fastener, the legs 3 and 4 of the fastener may be twisted together, as at 8, see Fig. 2, and the elements $a$, $a$ firmly secured together and to the anchoring cable $b$ The angular ends 5 and 6, when engaged by a tool, prevent turning or slipping of the fastener and insures the twisting of the legs 3 and 4 together, as shown, and permits a purchase by the tool on the legs 3 and 4 to insure their twisting, all of which it is believed will be understood.

It is pointed out, as those skilled in the art of doing revetment work along rivers know, that the spaces between the sections of the mattresses where the wires $a, a$, are secured to the cable $b$ are rather narrow and the handling and assembly of the parts $a, a$, and $b$ inconvenient and, therefore, the construction of the throat 7 permits the easy and convenient insertion of the fastener between the sections of the mattresses to apply the same to the securement of the parts $a, a$ and $b$ therewithin by the twisting of the legs 3 and 4 together. It is further pointed out that when the fastener is in applied position the angular portions of the legs 3 and 4 are in a position, in relation to the upper surface of the mattress to make easy the application of a tool to the fastener and the operation of the same to twist the legs 3 and 4 together and about the parts to be secured.

What I claim is:—

A fastener for use in revetment work, comprising a length of wire bent on itself to provide an arcuate end and legs extending therefrom, one leg being shorter than the other and the end of each leg turned at right angles; the turned portion of the shorter leg being in a direction from the longer leg and the turned portion of the latter being in the direction of the shorter leg, and said turned portions providing a throat therebetween in communication with the space between said legs whereby the fastener may be applied by moving same laterally of the parts to be connected to cause said parts to be received in the throat, followed by further movement of the fastener at substantially right angles to the first movement to cause the parts to be connected to lie between the legs, said turned portions being formed to engage a twisting tool for twisting the legs so as to prevent turning or slipping of the fastener during twisting.

CHARLES F. BAILEY.